United States Patent
Hrle et al.

(10) Patent No.: US 9,886,347 B2
(45) Date of Patent: Feb. 6, 2018

(54) DATA REPLICATION IN A DATABASE MANAGEMENT SYSTEM

(71) Applicant: International Business Machines Corporation, Armonk, NY (US)

(72) Inventors: Namik Hrle, Boeblingen (DE); Daniel Martin, Stuttgart (DE); Chandrasekaran Mohan, San Jose, CA (US); Sunil K. Sarin, Newton, MA (US); James D. Spyker, Toronto (CA); Yongfeng Yao, Foster City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 462 days.

(21) Appl. No.: 14/592,165

(22) Filed: Jan. 8, 2015

(65) Prior Publication Data
US 2016/0203050 A1    Jul. 14, 2016

(51) Int. Cl.
*G06F 17/30* (2006.01)
*G06F 11/14* (2006.01)

(52) U.S. Cl.
CPC .... *G06F 11/1402* (2013.01); *G06F 17/30289* (2013.01); *G06F 17/30581* (2013.01); *G06F 17/30917* (2013.01)

(58) Field of Classification Search
CPC ......... G06F 17/30289; G06F 17/30581; G06F 17/30917
See application file for complete search history.

(56) References Cited

U.S. PATENT DOCUMENTS

| | | | |
|---|---|---|---|
| 7,266,541 B2 | 9/2007 | Amiri et al. | |
| 8,352,425 B2 | 1/2013 | Bourbonnais et al. | |
| 8,407,183 B2 | 3/2013 | Foeldesi et al. | |
| 8,650,150 B2 | 2/2014 | Zhao et al. | |
| 2013/0073513 A1* | 3/2013 | Kemper | G06F 17/30587 707/600 |

(Continued)

OTHER PUBLICATIONS

Funke et al., "Compacting Transactional Data in Hybrid OLTP &OLAP Databases," Proceedings of the VLDB Endowment, vol. 5, No. 11, 2012, 12 pages.

(Continued)

*Primary Examiner* — Cam-Y Truong
(74) *Attorney, Agent, or Firm* — Cantor Colburn LLP; Erik Johnson (57) ABSTRACT

According to an aspect, a database management system (DBMS) is operated to perform data replication. The DBMS includes a source database and a target database. The source database includes a plurality of first tables respectively comprising one or more first columns, and the target database includes a plurality of second tables respectively comprising one or more second columns. Each of multiple ones of the first columns is mapped to one of the second columns, and each one of the second columns is adapted to store replicated data changes of the first column mapped to the second column. Each of the second columns has an assigned update time, the update time being a moment in time when the second column most recently received incremental data changes from its mapped first column. The DBMS operates to process requested database statements while providing data replication.

18 Claims, 4 Drawing Sheets

(56) References Cited

U.S. PATENT DOCUMENTS

2013/0110764 A1* 5/2013 Wilf ................. G06F 17/30592
707/600
2016/0171068 A1* 6/2016 Hardin ................ G06F 11/1415
707/610

OTHER PUBLICATIONS

Kemper et al., "HyPer: A Hybrid OLTP&OLAP Main Memory Database System Based on Virtual Memory Snapshots," ICDE Conference 2011, IEEE, 2011, 12 pages.

Kemper et al., "HyPer: Adapting Columnar Main-Memory Data Management for Transactional and Query Processing," Bulletin of the IEEE Computer Society Technical Committee on Data Engineering, IEEE, 2012, 6 pages.

* cited by examiner

DATA REPLICATION IN A DATABASE MANAGEMENT SYSTEM

BACKGROUND

The present disclosure relates generally to a computer system, and more specifically, to data replication in a database management system.

Various types of database management systems (DBMS) exist which are usually optimized for performing some particular kinds of database queries efficiently. Said special-purpose DBMS may be able to efficiently process database queries of a first type but may be slow when processing database queries of another type because the table structure and indices of the database managed by the DBMS are not optimized for said other kind of queries. For example, an OLAP database may process OLAP queries efficiently, but not OLTP queries. An OLTP database may process OLTP queries efficiently, but not OLAP queries.

Some existing approaches (based e.g. on hybrid DBMSs) try to overcome said difficulties by storing the data redundantly in two different copies of the data to be queried. Each copy is stored in a database that may be optimized for efficiently performing a particular kind of database query.

In addition to said OLTP/OLAP scenario, other use cases exist where data is stored redundantly in multiple databases having the same or a different structure, e.g. in the context of cloud environments.

A problem associated with storing multiple copies of the same data in multiple databases is that data changes applied in one of said copies need to be replicated to the other copy. Before said replication is successfully performed, said two copies are out of sync and may return different results in response to a database query. Data-synchronization protocols such as the "two-phase commit protocol" (2PC) coordinate all the processes that participate in a decision on whether and when to replicate a transaction that has already been performed in one of said two copies to the other copy. The replication shall ensure data consistency of the two copies. However, said 2PC protocols are "heavy-weight" because synchronous round-trips for keeping the two data copies in sync generate a significant computational overhead.

SUMMARY

Embodiments include a method, system, and apparatus for operating a database management system (DBMS). The DBMS comprises a source database and a target database. The source database comprises a plurality of first tables comprising first columns. The target database comprises a plurality of second tables comprising second columns. Each of multiple ones of the first columns is mapped to one of the second columns, whereby each one of said second columns is adapted to store replicated data changes of the first column mapped to said second column. Each of the second columns has assigned an update time. The update time is a moment in time when said second column most recently received incremental data changes from its mapped first column. The method comprises: the DBMS receiving a request to perform a requested statement. A 'statement', as used herein, is a database statement, e.g. an SQL statement. The DBMS predicts one or more of the second columns that will be accessed when processing the requested statement. The DBMS determines, for each of the predicted second columns, its assigned update time. The DBMS identifies a syncpoint time, whereby the syncpoint time is the most recent update time of all said determined update times. The DBMS identifies a starting time, wherein the starting time is the earliest update time of all said determined update times. In case the identified starting time differs from the identified syncpoint time, the DBMS selectively and incrementally replicates data changes from all first columns mapped to one of the predicted second columns to said predicted second columns such that all data changes imposed on said first columns between the starting time and the syncpoint time are selectively replicated to said predicted second columns. The replication of the data from a first column to a second column may be executed in accordance with the mapping of first and second columns. After said replication, the update time of each of said predicted second columns is set to the syncpoint time. The DBMS delays execution of the requested statement until a successful termination of said replication. Subsequent to the termination, the DBMS executes the requested statement in the target database.

Additional embodiments include a method, system, and computer program product for operating a DBMS that includes a source database and a target database. The source database comprises a plurality of first tables respectively comprising one or more first columns. The target database comprises a plurality of second tables respectively comprising one or more second columns. Each of multiple ones of the first columns is mapped to one of the second columns. The database management system is configured to replicate data changes of any one of the first columns to its mapped second column in a batch-wise manner. The replication of the data changes comprises: automatically and repeatedly evaluating a request history of each of the second columns for determining an access frequency of said second column, the request history being indicative of the number of statements having been performed on said second column previously during a predefined time interval in response to a request of a client; automatically calculating a batch size for said second column, the batch size being indicative of the maximum allowable number of statements within an individual batch or a maximum batch size, wherein the calculation is such that the maximum allowable number or maximum batch size negatively correlates with an access frequency of said second column; and for each of the second columns: creating a batch by pooling data changes of the first column mapped to said second column that have not yet been replicated to said second column; upon determining that the size of said batch has reached its calculated batch size, automatically performing the batch, thereby replicating the data changes pooled in said batch to said second column.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In the following, like numbered elements in the figures designate similar elements or elements that perform an equivalent function. Elements which have been discussed previously will not necessarily be discussed in later figures if the function is equivalent.

A "database" as used herein is a collection of electronic information that is organized in memory or on a non-volatile storage volume in the form of a particular, defined data structure which supports or is optimized for data retrieval by a particular type of database query.

A database may be organized in tables or columns or other forms of data structures to provide efficient retrieval. An individual table may act as database. In conventional databases, all tables of the database have the same structure in respect to the physical organization of the data in the memory or on a non-volatile storage medium. For example, some row-oriented databases may comprise multiple tables which organize their data in a row-oriented manner. Some column-oriented databases may solely comprise tables which organize their data in a column-oriented manner. In said cases, the database and all its tables may structurally be optimized for a particular type of database query.

There exist also some DBMS which store data redundantly in different data structures that support different kinds of database queries. For example, some DBMS, when storing some data in a row-oriented manner, automatically create a copy of said data and store the copy in a column-oriented manner. The DBMS may hide the two different data structures comprising the two data copies and being optimized for different kinds of database queries from the user: the DBMS may "present" only a single "virtual table" at which database queries may be directed and automatically dispatches the database queries to the one of the two data structures which is optimized for processing said kind of query. Although said kind of DBMS present only a single "virtual table" to the user or client application programs, in fact said DBMS comprise two different database tables whose structure is optimized for different kinds of database queries. Said two different kinds of database tables (e.g. a data container organized in row-major order and a data container organized in column-major order), although represented by a single "virtual table", will in the following be considered as two databases optimized for different kinds of database queries which may respectively act as source database or as target database. Thus, according to the above definition, a "virtual database table" that dispatches database queries to one of a plurality of different data structures optimized respectively for different kinds of database queries is thus, according to the above definition, not a 'database' in the sense of embodiments of the invention. Rather, each of said plurality of different data structures would respectively resemble a "database" as used herein.

A "database management system" (DBMSs) is a software and/or hardware based system that is designed to allow the definition, creation, querying, updating and administration of one or more databases. Typically, a DBMS is operable to interact with a user, with other applications, and one or more databases managed by the DBMS to process some requests and to analyze data. Well-known DBMSs include MySQL, MariaDB, PostgreSQL, SQLite, Microsoft SQL Server, Microsoft Access, Oracle, SAP HANA, dBASE, FoxPro, IBM DB2, and others.

The term "statement" as used herein refers to a structured query language (SQL) statement, which performs a write operation (INSERT, UPDATE or DELETE) in a database or a read operation (SELECT) to read data from the database. The read data may have the form of a result set, i.e., a logical set of columns and rows of data returned by executing a read statement. A "transaction" or "database transaction" is a logical unit of database operations which are executed as a whole to process user requests for retrieving data. A transaction is a larger unit that comprises and frames one or more statements. A transaction ensures that the action of the framed statements is atomic with respect to recovery.

The term "log" as used herein refers to a data structure acting as a container for information on all statements and transactions having been performed on a particular database. Depending on the embodiment, the log may comprise information being sufficient for recovering the contents of the database, and may also comprise information for statistics, traces, or performance evaluation. A 'log' may be implemented as electronic document, e.g. a text file, a binary file or a set of database records. A single physical data structure (file, set of database records, etc.) may comprise the logs of multiple databases. A log comprises "log records". A "log record" is a single atomic record of activity within the SQL engine operating on the logged database.

The term "data consistency" of two databases as used herein implies that a particular request will return an identical result or almost identical result irrespective of the database used for processing the request.

The 'prediction' of the second columns, as used herein, describes the automated calculation of the one or more second columns that will be accessed when the DBMS processes a particular statement, e.g. an SQL SELECT statement. The 'prediction' may have different degrees of reliability: if the prediction is based on parsing the SQL statement, the prediction may be 100% accurate because the second columns will be specified as part of the SQL statement. If the prediction is based on a statistical analysis of a query history, e.g. a target log, the prediction may not be 100% accurate because the prediction is merely based on a statistical evaluation. Nevertheless, both implementation variants for predicting the second columns (or second tables) to be accessed when processing a query shall in the following be covered by the term 'prediction'.

Figure 1:
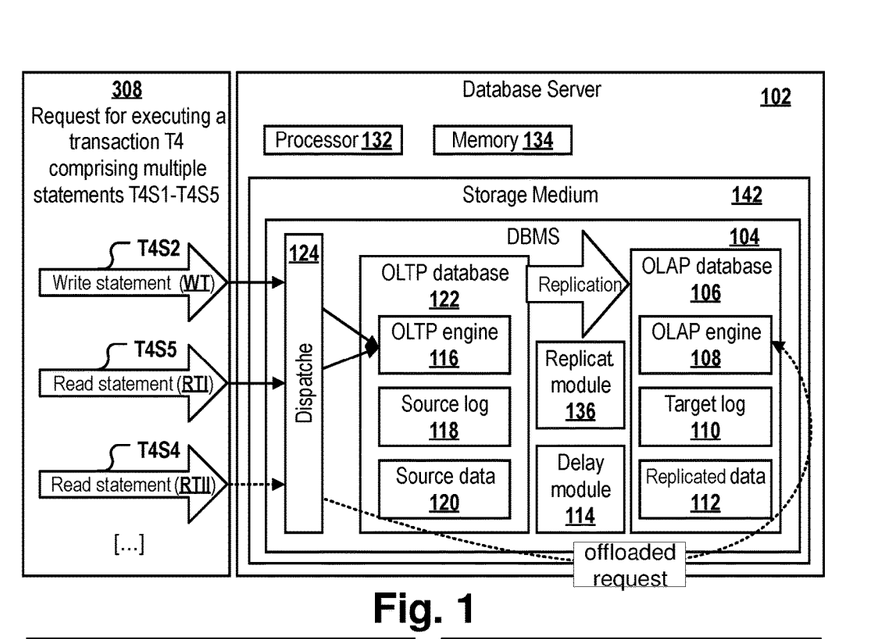
FIG. 1 illustrates an embodiment of a DBMS in accordance with an embodiment.
Figure 4:
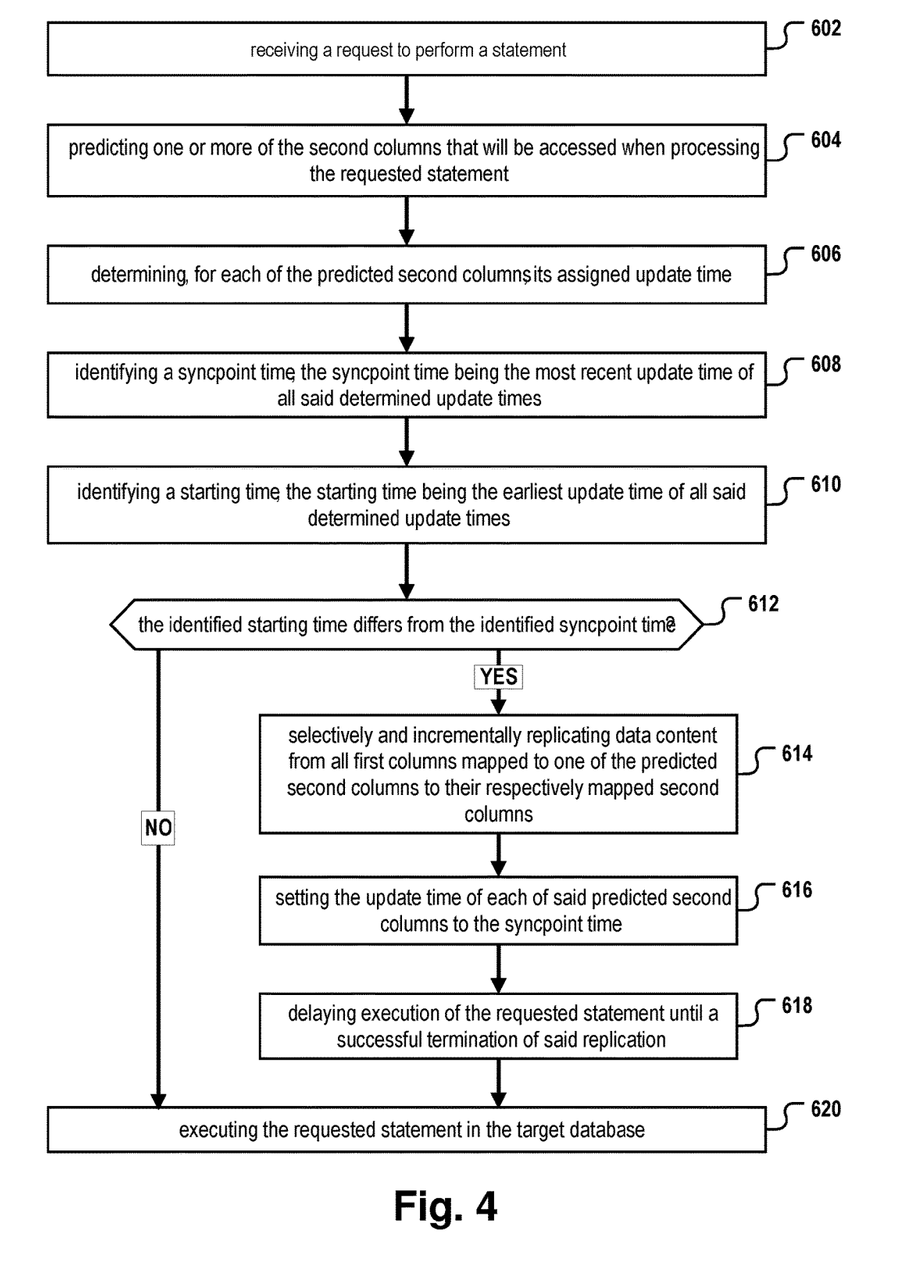
FIG. 4 is a flowchart of a method according to an embodiment.

FIG. 1 and FIG. 4 will in the following be described together to illustrate embodiments of the above mentioned method of operating a DBMS and the corresponding DBMS.

FIG. 1 shows a block diagram of a DBMS 104 comprising a source database 122 and a target database 106. The DBMS may be hosted by a database server 102. The source database comprises a plurality of first tables ST1, ST2, ST3, ST4 as depicted, for example, in FIGS. 2A and 2B. Each first table comprises one or more first columns SC1-SC13. The target database 106 comprises a plurality of second tables TT1-TT4 respectively comprising one or more second columns TC1-TC13.

Figure 2A:
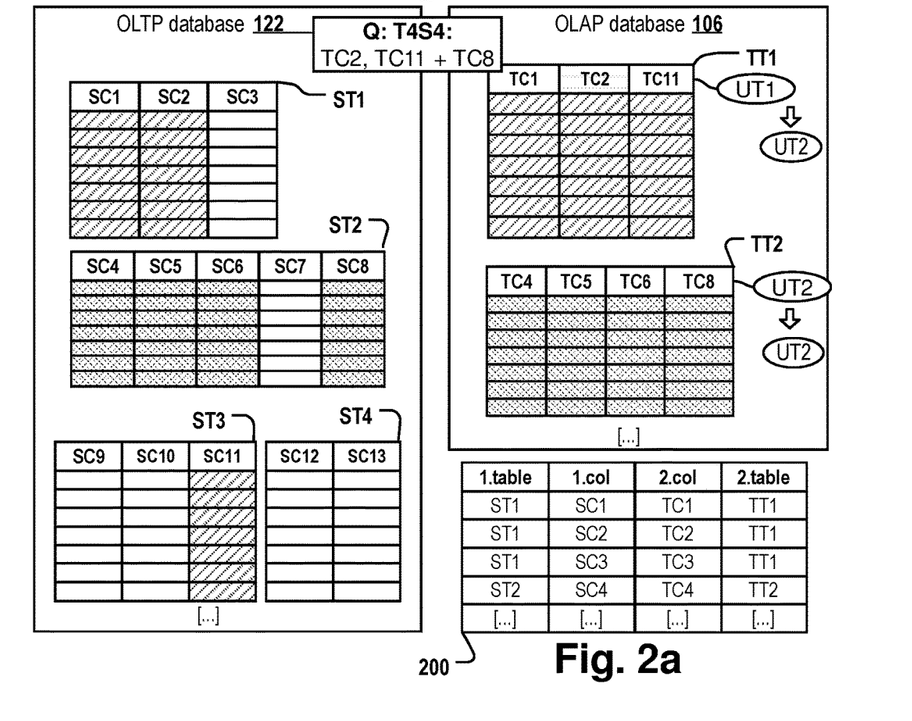
FIGS. 2A and 2B show a plurality of first and second columns in accordance with an embodiment.
Figure 2B:
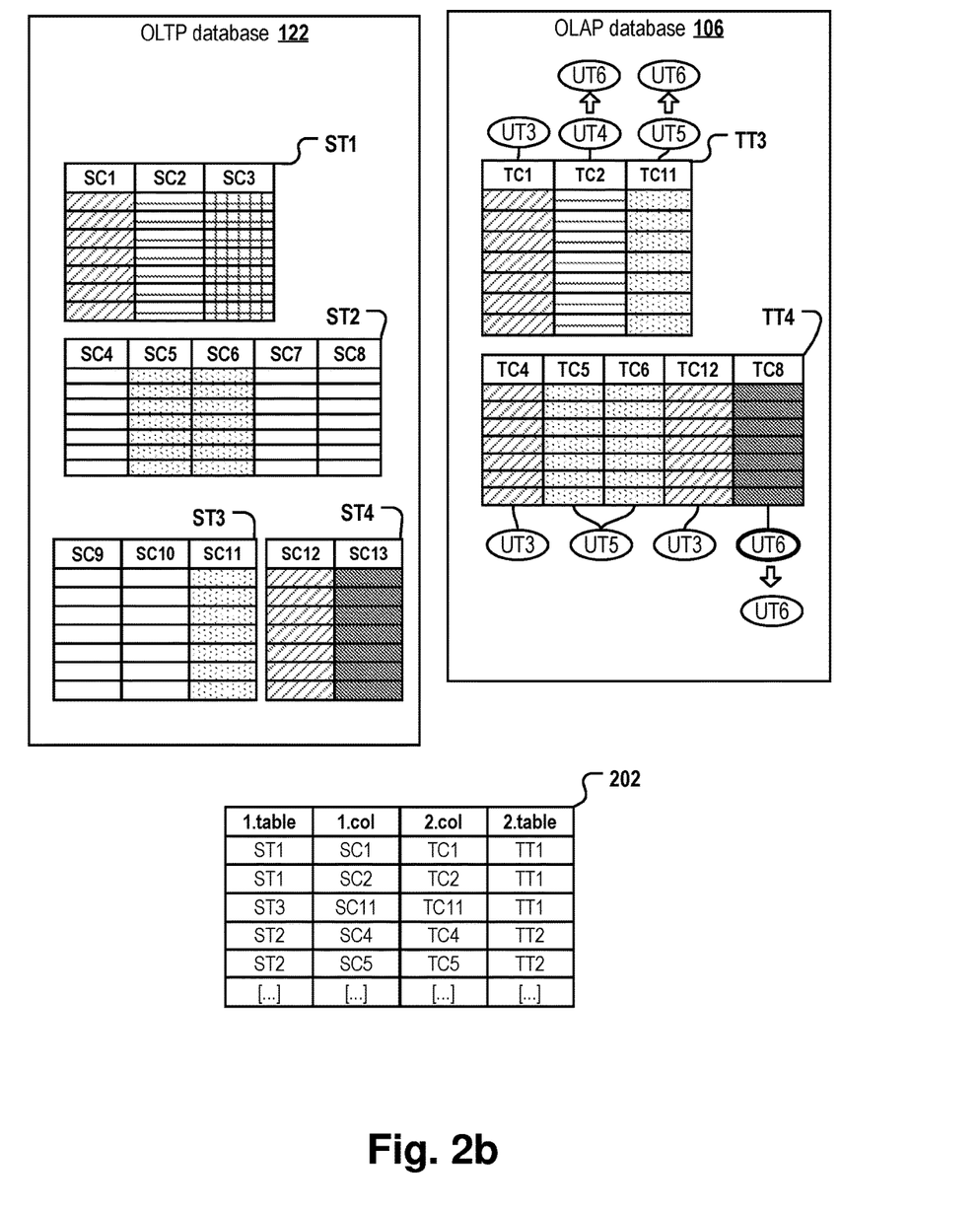

Each of multiple ones of the first columns is mapped 200, 202 to one of the second columns (see FIGS. 2A and 2B). Each one of said multiple second columns is adapted to store replicated data changes having originally been introduced and stored in its respectively mapped first column.

Each of the second columns has assigned an update time UT1-UT6 as depicted, for example, in FIGS. 2A and 2B. The update time is a moment in time when said second column most recently received incremental data changes from its mapped first column. In block 602, the DBMS receives a request 308 to perform a requested statement T4S4. For example, the request may comprise requests for multiple statements T4S2, T4S5, T4S4 which respectively may be analyzed to determine if the analyzed requested statement belongs to a first type of statements WT, RTI, e.g. write statements or simple read ('SELECT') statements, or to a second type of statement RTII, e.g. complex read ('SELECT') statements.

The DBMS predicts in block 604 one or more of the second columns that will be accessed when processing the requested statement T4S4. The DBMS determines in block 606, for each of the predicted second columns, its assigned update time.

In block 608, the DBMS identifies a syncpoint time. The syncpoint time is the most recent update time of all said determined update times. In block 610, the DBMS identifies a starting time. The starting time is the earliest update time of all said determined update times. In block 612 the DBMS examines if the identified starting time differs from the identified syncpoint time. If so, the DBMS selectively and incrementally replicates in block 614 data changes from all first columns mapped to any one of the predicted second columns to said predicted second columns such that all data changes imposed on said first columns between the starting time and the syncpoint time are selectively replicated to said predicted second columns. For example, the replication module 316 may perform said replication in response to the receipt of the request 308 for executing the requested statement T4S4 in the target database. After said replication, the update time of each of said predicted second columns is set to the syncpoint time in block 616. The DBMS in block 618 delays the execution of the requested statement T4S4 until a successful termination of said replication. After said termination, the DBMS in block 620 executes the requested statement in the target database.

Said features may be advantageous as the delay time for executing the query on the target database may be reduced: rather than replicating all data changes having committed in any one of the tables of the source database to the target database (which may involve the replication of a huge amount of data and a correspondingly high network traffic and/or delay time), only a selected subset of data changes is replicated to the target database in response to receiving the request. The "syncpoint time" as the most recent update time of all tables referenced in a query may thus not be calculated globally, but on a "per query" basis. This may help reducing the number of changes that have to be replicated before the requested statement can execute.

The suggested way of replicating selected fractions of the data changes by predicting those columns of the target database that will be accessed when processing the requested query, may destroy referential integrity of the replicated data. For referential integrity to hold in a relational database, any field in a table that is declared a foreign key can contain either a null value, or only values from a parent table's primary key or a candidate key. In other words, when a foreign key value is used it must reference a valid, existing primary key in the parent table. For instance, deleting a record that contains a value referred to by a foreign key in another table would break referential integrity. It has been observed that in many cases it is not necessary to impose referential integrity on the target database. For example, if analytical queries (e.g. queries that analyze the data to determine a pattern or a trend) are executed on the target database, it may not be necessary to limit this analysis to data that conforms to the requirement of referential integrity. By selectively replicating data changes in a column-wise manner, not in accordance with the chronological sequence of transactions having committed in the source database, the total amount of replicated data may be reduced and thus the requested statement may be performed on the target database with very short delay.

According to embodiments, the structure of the source database is optimized for a first type WT, RTI of database queries, e.g. OLTP queries, and the structure of the target database is optimized for a second type RTII of database queries, e.g. OLAP queries. The second type may differ from the first type of queries. This may be advantageous as the performance of query processing may be increased by providing two databases being optimized for different kinds of queries.

According to some embodiments, the prediction of the one or more second tables comprises automatically parsing the requested statement and using all second columns referenced in said parsed requested statement as the second columns. Said approach may be advantageous, because it is highly accurate for the currently received request. So even in case the currently requested statement would accesses second columns which were never accessed before, the DBMS will recognize said second columns when analyzing the received statement, e.g. by analyzing the arguments of an SQL query.

According to other embodiments, the DBMS automatically evaluates a request history. For example, the request history may be stored in form of a target log that may comprise all statements having been performed on the target database previously. The request history is indicative of all tables and columns of the target database which have previously been accessed when processing a requested statement. The evaluation comprises identifying or calculating an access statistic, the access statistic being indicative of an access frequency of each of the second columns or of each of the second tables in the target database. Said features may be advantageous as less CPU capacity may be consumed at runtime when receiving and processing the request. For example, the access statistics may be pre-calculated at times when only few requests are received. For example, calculating the access statistics may comprise evaluating SELECT requests of the first and of the second query type, e.g. of the OLTP type and of the OLAP type for identifying those second columns and second tables that will probably be accessed when executing the requested statement on the target database. Alternatively, only SELECT requests of the second query type are evaluated.

According to some embodiments, the update times are assigned on a per-second-table basis to the second columns. The update times assigned to second columns which are contained in the same one of the second tables are identical. The predicting of the one or more second columns comprises predicting one or more second tables that will be accessed when processing the requested statement. All second columns contained in the predicted second tables are used as the predicted second columns. The determination of the update time of the second columns comprises: determining the update time assigned to a second table predicted to be accessed when processing the requested statement; and using said determined update time as the update time assigned to the second columns. Executing the replication comprises replicating data changes from all first columns mapped to second columns of any one of the predicted second tables such that all data changes imposed on said first columns between the starting time and the syncpoint time are selectively replicated to said second columns of the predicted second tables. After said replication, the update time of each of said predicted second tables is set to the syncpoint time. Using table-based rather than column based update times may be advantageous when the granularity of the target log in respect to committed transactions is on the level of individual second tables, not on the level of individual second columns. In addition, the updating of the update times may be facilitated and accelerated.

According to embodiments, the blocks 614, 616 and 618 are skipped in case the identified starting time does not differ from the identified syncpoint time. Thus, the query can be executed on the target database without delay. Said features may be advantageous, because if all update times of the referenced second tables or second columns are equal, the requested statement may be executed right-away in the target database. Using a mapping between first and second columns for replication may be advantageous as the structure of the first and second tables may differ as the first and second database and their respective table structure may be optimized for different query types.

In the following, if not explicitly specified otherwise, embodiments described herein which are based on predicting second columns that will be accessed when performing a requested statement should be considered to disclose also analogous embodiments which perform the prediction and subsequent replication of data in response to receiving a request on a per-second-table basis.

By determining the second column (or all second columns of a second table) that was updated most recently, and by updating all other determined second columns (or tables) predicted to be accessed when executing the requested statement, the DBMS may be enabled to bring said determined second columns (or second tables) "in sync/make it consistent with" said particular determined second column (second table). Thus, when the query is executed on the target database after having synchronized the content of the second columns (second tables) having been predicted to be accessed, it is ensured that the data of the target database accessed when performing the requested statement is "in sync" with the source database, i.e., represents the data content of the source database in the mapped first columns (first tables) at a single moment in time. Said moment may lie some seconds, minutes or even hours in the past. Thus, the requested statement will not necessarily access the most recently added data (that may yet only be contained in the source database), but it will access data stored in second columns which are consistent as they reflect a single moment in time. As different kinds of requested statements will be predicted to access different second columns (and different second tables), the determined syncpoint time may vary for each query.

According to embodiments, the requested statement is one of a plurality of requested statements received by the database management system during a predefined first time interval. For example, the predefined first time interval may range between 50-100 milliseconds or even 5-10 seconds or even several minutes. The DBMS performs the prediction of the one or more of the second columns for each of the plurality of requested statements. The DBMS generates, from all second columns predicted for said plurality of requested statements, a unique set of predicted second columns (each predicted second column mentioned only once; the unique set of predicted second columns may consist of the second tables of a unique set of second tables if the replication is performed second-table-wise). The DBMS uses said unique set of second columns as the one or more predicted second columns for performing the identification of the syncpoint time. This may be advantageous, because pooling multiple requests over a predetermined first time interval may allow for a reduction of computational overhead and a more efficient replication.

According to embodiments, the source database has assigned a source log and the target database has assigned a target log. The update time is assigned to each of the second columns in the form of log sequence numbers of the source log or in form of log sequence numbers of the target log. The log sequence numbers of the target log are mapped to log sequence numbers of the source log which represent the same moment in time. Performing the selective and incremental replication of the first columns to the predicted second columns comprises, for each of said first columns:

identifying a start log sequence number being indicative of the update time currently assigned to said second column;

identifying an end log sequence number being indicative of the identified syncpoint time;

identifying all first columns mapped to one of the predicted second columns;

identifying, in the source log, all write statements having been performed on any one of said first columns between the start log sequence number and the end log sequence number;

identifying, within said identified write statements, all data changes applied on said identified first columns; and selectively applying the identified changes in the identified first columns to the respectively mapped second columns.

Other changes in first columns which are not mapped to one of the predicted second columns will not be replicated in response to the query. They may not be replicated at all or may be replicated by other trigger mechanisms described herein, e.g. if a batch of non-replicated statements exceeds a maximum size.

Using log sequence numbers as described for identifying the data changes that shall be replicated for the predicted second queries may be advantageous as said information may already be provided by some state of the art DBMS or logging systems. Thus, no additional effort for storing the update time may be necessary.

According to embodiments, the log sequence numbers of the source log of the source database and the log sequence numbers of the target log of the target database are in sync. The source log and the target log being in sync implies that the log sequence numbers of the source log and the log sequence number of the target log are mapped to each other such that a global chronological order of log entries in the source log and the target log can be derived. Thus, the mapping of log entries may represent a kind of "global" clock of the DBMS that is valid both for the source and for the target database. Thus, the identified current source commit log sequence number can be used for determining if the data changes imposed by said transaction having committed most recently in the source database were already replicated to the target database.

According to embodiments, the DBMS regularly, at second time intervals, and for each of the first columns of the source database, includes yet unreplicated data changes in said first column in one or more batches, the one or more batches to be used in a future incremental replication, whereby said uncommitted and unreplicated data changes are added to said batches irrespective of whether the second columns mapped to said first columns are predicted to be accessed when processing a future requested statement, and whereby replicating said batches also comprises updating the update time assigned to said second columns. Said features may be advantageous as also data changes in first columns whose mapped second columns are accessed only rarely or not at all are replicated to the target database. This may prevent long delay times in case a particular second column (or second table) was not accessed for a long time. In said cases, it may take a comparatively long time to replicate the relevant data changes to bring the predicted second columns "in sync". This situation may be avoided by regularly replicating also first columns mapped to infrequently accessed second columns. For example, the update time of said second tables could be set to the moment in time of performing the replication of the batch.

According to embodiments, the incremental replication of data changes is performed fully or partially in parallel, i.e. concurrently on multiple different processors or processor cores. This may further increase the performance of replication and may reduce delay times.

According to embodiments the incremental replication of the data changes in multiple first columns to respectively mapped second columns in response to receiving the request for executing the requested statement is performed in one or more batches. In addition, data changes in multiple first columns are replicated automatically at second time intervals to respectively mapped second columns. Said replication may also be performed by means of batches.

According to embodiments, the method can include:
a) compiling the one or more batches, each batch comprising statements of one or more transactions that have been executed in the source database and have not yet been replicated to the target database and that are directed at one of the first columns mapped to one of the second columns predicted to be accessed when processing the requested statement;
b) grouping the statements of each batch into one or more commit groups, wherein all statements contained in any of the commit groups belong to the same transaction having already committed in the source database, wherein said commit groups are free of statements of non-committed transactions;
c) replicating the batch, thereby replicating all data changes imposed by the statements in the one or more commit groups of the batch to the target database in a single step; and
d) upon having successfully replicated the batch, updating the update time assigned to each second column to the syncpoint time.

Using commit groups rather than performing individual database statements may reduce the computational overhead when replicating data changes, thereby increasing performance of data replication.

According to some embodiments, the batches are compiled during second time intervals and automatically replicated when any one of said second time interval has lapsed.

According to embodiments, the method further comprises, for each of the second columns contained in the target database:
automatically evaluating a request history of said second column, the request history being indicative of the number of requested statements having been received previously during a second time interval, whereby the processing of said requested statements comprised accessing said second column;
automatically calculating a batch size for said second column, thereby using the request history of said second column as input; a batch size specifies the maximum allowable number of statements within an individual batch or the maximum allowable batch size; the calculation is such that the maximum allowed number or the maximum batch size negatively correlates with an access frequency of said second column; for example, for a frequently accessed ("hot") second column a small batch size may be calculated and for a rarely accessed ("cold") second column a comparatively large batch size may be calculated;
performing steps a)-d), whereby the creation of the batches is performed in accordance with the automatically calculated batch size. Replicating said batches may also comprise updating the update time assigned to said second columns.

Said features may reduce delay time for the queries directed at said second column. Data changes to be replicated to rarely accessed second columns (second tables) are added to larger batches, thereby reducing computational overhead. The large batches will probably not result in a delay as the respective second columns (second tables) are accessed only rarely).

While the predefined first time intervals may be used for collecting multiple requested statements to be performed on the target database, and for predicting the second columns for which data replication shall selectively be triggered, the second time intervals may be used for collecting data changes applied to the source database. Thus, the first and second predefined time intervals may fulfill different functional purposes. Both kinds of time intervals and the respective replication functionality may be combined in some embodiments, thereby providing a request-driven replication approach in combination with a data-change-driven approach. The batches compiled during a second time interval may be specific for a particular second column or for a particular second table and may selectively comprise data changes of first columns mapped to said second columns or second tables.

According to embodiments, the one or more batches are a plurality of batches having different batch sizes. The inclusion of the yet unreplicated data changes in said first columns in the plurality of batches during one of the second time intervals comprises, for each first column (or first table) whose changes were included: evaluating the target log for identifying, for each of the first columns (or first tables), an access frequency, the access frequency being indicative of the frequency of accessing the one of the second columns (second tables) mapped to said first column (first table) in response to previous requests; and distributing the yet unreplicated data changes to the sequence of batches, whereby data changes of first columns whose mapped second column have the highest access frequency are distributed to the one of the multiple batches having the smallest batch size; and whereby data changes of first columns whose mapped second column have the lowest access frequency are distributed to the batches with the largest batch size.

For example, the batch size used for replicating changes to the most frequently accessed ("hot") columns may be 10 Mb. In some embodiments, there is one batch per second column or one batch per second table, in other embodiments data changes to be replicated to multiple second columns (or tables) having similar access frequencies are pooled in one batch. There may be one or more medium sized batches of about 50 Mb for replicating data changes to second columns having an average access frequency. And there may be one or more batches of about 150 Mb size for replicating data changes to second columns which are rarely or never accessed when a requested statement is performed on the target database. This may be advantageous, because small batch sizes may be used for replicating data to frequently accessed ("hot") second columns. This may reduce delay time for the queries directed at said second column. Data changes to be replicated to rarely accessed second columns (second tables) are added to larger batches, thereby reducing computational overhead. The large batches will probably not result in a delay as the respective second columns (second tables) are accessed only rarely).

According to embodiments, the access frequency are determined not per-second-column wise, but per-second table, and also the statements comprising instructions for replicating the data changes are distributed to the multiple batches in a per-second table basis.

According to some embodiments, the sizes of the batches is dynamically adapted in dependence on the identified access frequencies, whereby in case the fraction of second columns having a high access frequency rises, the number of batches having a small batch size, e.g. 10 Mb, is increased. In case the fraction of second columns having a low access frequency rises, the number of batches having a high batch size, e.g. 150 Mb, is increased. This may be advantageous as the delay time may be kept short and the computational overhead for replication may be kept low for many different, dynamically varying use case scenarios where different requests result in accessing different second columns. By automatically performing the replication in second time intervals also for first tables whose mapped second tables are not accessed frequently, the recovery time of the DBMS in case of a power outage or other kind of problem may be reduced.

According to embodiments, the method further comprises regularly, at third time intervals, evaluating each of the first columns for determining if they comprise any new, unreplicated data changes having been stored there since the last replication of its data changes. If one of said evaluated first columns does not comprise any new unreplicated data changes, the DBMS sets the update time of any one of the second columns mapped to said first column to the time of performing said evaluation. For example, this could be done by means of log sequence number, e.g. by determining the current head of log sequence number and using the time represented by the current head of log as the update time of the mapped second table. This may be advantageous because long recovery times in case of a system crash can be avoided. In case of a system crash or power outage, the rebooted DBMS may automatically start to replicate all unreplicated data changes having been performed after a checkpoint entry in the source log. If some second columns were not accessed for a long time, their mapped first columns may comprise a huge amount of unreplicated data and the recovery process may take a comparatively long period of time. The third time interval may comprise multiple minutes, or multiple ours, or even multiple days. According to embodiments, the regular evaluation at the third time intervals may only be executed when the CPU load of the system is low, e.g. at night.

According to embodiments, the receiving of the requested statement is performed by the DBMS receiving a request for executing a transaction. Said transaction comprises the requested statement and optionally one or more further statements. The method further comprises, for each of the statements in said transaction: the DBMS evaluating the statement for determining if said statement specifies a database query of the first type or of the second type; in case said statement is determined to be of the first type, the database management system dispatching the statement for execution to the source database, skipping the delay step and immediately executing the requested statement in the source database; in case said statement is determined to be of the second type, the database management system dispatching the statement for execution to the target database and performing the delaying and the delayed execution of the statement in the target database.

The requested statement may be determined to be of the second type and may then be dispatched to the target database. This may be advantageous, because the underlying database structure may be made transparent to a client submitting the request. Thus, the "client" does not have to decide if the query should be directed at the source database or the target database. Rather, the DBMS may dynamically determine if the query should be processed on the source or the target database to achieve the best compromise of response time and accuracy. For example, the source database may be an OLTP database and the first type of database queries may comprise INSERT statements, UPDATE statements, DELETE statements and/or index-based SELECT statements. The target database may be an OLAP database and the second query type may consist of SELECT statements that execute a non-index based sequential table-scan.

According to embodiments, the DBMS identifies in the source log a current source commit log sequence number LSNMRCR, the current source commit log sequence number indicating a commit event of a first one of the transactions which committed in the source database most recently before the receiving of the request. Performing the incremental replication of the data changes comprises identifying of unreplicated data changes imposed on said first columns until the syncpoint time, whereby said changes are imposed by transactions having committed in the source database at or before said current source commit sequence number. The DBMS selectively replicates said identified data changes.

Selectively replicating changes imposed by committed transactions may be advantageous as this may ensure that data changes that may have been rolled back in the source database later are not persisted in the target database. Such kind of data could result in inconsistent query results. Using a current source commit log sequence number for identifying the commit event of a first one of the transactions which committed in the source database most recently before the receiving of the request may be advantageous as said commit log sequence numbers may readily be provided by some existing DBMSs and logging systems.

According to embodiments, the method further comprises: identifying a requested transaction to which the requested statement belongs; after the delaying, executing statements preceding the requested statement and being contained in the identified requested transaction; the execution of the preceding statements and of the requested statement is performed in the target database in accordance with the order of said statements within the requested transaction; executing the requested statement comprises reading data from the target database; the read data also comprises changes imposed by the preceding statements; returning the read data; and after returning the read data, undoing the data changes in the target database imposed by the preceding statements. This may be advantageous because also uncommitted changes of preceding statements having the same transactional context as the actually requested statement are also "seen" in the target database without bringing the source and the target database out of sync: if the requested query would be performed on the source database, the uncommitted changes would normally be seen. However, if the requested statement is performed on the target database, the preceding uncommitted changes of the same transactional context would not be "seen" because in conventional replication approaches only committed data changes are replicated. By replicating also uncommitted data changes of the same transactional context and by undoing said changes in the target database later, it can be ensured that redirecting the request to the target database will yield exactly the same result as when the query would have been executed on the source database.

When using a "batch-size driven trigger mechanism", replication may alternatively or in addition to the request-driven trigger mechanism also be triggered in dependence on a batch size, whereby the maximum size of a batch that triggers replication may be determined based on previously observed access frequencies of corresponding columns or tables. Said features may be advantageous as the access-frequency based calculated maximum allowed batch size may allow to replicate frequently accessed ("hot") columns in the background more often than rarely accessed columns and tables. The replication may be triggered solely by the batch size reaching the calculated maximum value. This may increase the probability that in case a request is received that can be executed more efficiently on the target database than the source database, said request can immediately be dispatched to and executed on the target database. Said request may be executed without delay and return the same result as if it would have been executed on the source database, because the above described batch-based replication strategy may likely have replicated all recent data changes in the background already. The higher the previous access frequency of a second column, the smaller the batch sizes and the more frequently a batch based data replication for said second column may be executed. Thus, at least on average, said autonomously triggered replication in the background that uses smaller batch sizes for frequently accessed second columns and larger batch sizes for less frequently accessed second columns may accelerate the processing of statements that are requested by a client.

According to embodiments, each of the second columns has assigned an update time. The update time is a moment in time when said second column most recently received data changes from its mapped first column. Said update times and the time of introducing a data change in one of the first columns may be evaluated for identifying data changes in the first columns that have not yet been replicated to the second column mapped to said first column. Performing one of the batches comprises updating the update time assigned to the second column.

According to embodiments, the batches may be created and replicated according to any of the above embodiments, e.g. by executing the steps a)-d) described for one of the above mentioned embodiments.

According to embodiments, the request-triggered data replication method according to any one of the above described embodiments and the calculated batch-size triggered replication method are both implemented by a database management system. This may increase the performance of processing requested database statements on the target database.

FIG. 2A shows a plurality of first columns SC1-SC13 of first tables ST1, ST2, ST3, ST4 being contained in the source database 122. The target database 106 comprises a plurality of second tables TT1, TT2 . . . respectively comprising one or more second columns TC1-TC8. The structure and column composition of the first and second tables may differ as the source and target database may be optimized for processing different kinds of database queries efficiently. The different hatchings indicate which first columns of the source database act as the data source for respectively mapped second columns of the target database.

A mapping 200 may assign all or at least some of the first columns to a respective one of the second columns. The mapping implies that all data changes imposed e.g. by INSERT, UPDATE or DELETE statements executed on a particular one of the first columns may be replicated later to its mapped second column.

OLTP and OLAP databases are only one possible implementation of a source and a target database being optimized for efficiently processing different kinds of database queries. According to other embodiments, the source database and the target database may be implemented in any possible combination of two different ones of the following database types:

an OLAP database (i.e., a database suitable to handle complex data models for business management and statistics by supporting multidimensional queries that may allow consolidating data in real-time);

an OLTP database (i.e., a database allowing updating existing transactional information to reflect gathered and processed information on all transaction having been performed in a transactional data processing system; OLTP databases ensure atomicity by efficient concurrency controls in order to guarantee that all the steps in transaction are completed successfully as a group);

a graph database (i.e., a database optimized for the storage and retrieval of data organized as a graph comprising nodes and edges), a triplestore (i.e., a database optimized for the storage and retrieval of subject-predicate-object triples), a key-value pair based database (also referred to as "correlation database", i.e., a database designed to efficiently handle unplanned, ad hoc queries; it uses a value-based storage (VBS) architecture in which each unique data value is stored only once and an auto-generated indexing system allows efficient retrieval of all values);

a document store (i.e., a database designed for storing and allowing efficient retrieval of document-oriented information, also known as semi-structured data and is typically implemented as NoSQL database);

a row-oriented database (i.e., a database that stores data tables as sections of columns of data rather than as rows of data by serializing all of the values of a column together, then the values of the next column), a column-oriented database (i.e., a database that stores data tables as sections of rows of data rather than as columns of data by serializing all of the values of a row together, then the values of the next row), one or more individual tables organized in column-major order; and one or more individual tables organized in row major order.

Depending on the embodiment, the source database and the target database may be managed by the same DBMS supporting multiple types of queries or may be managed by two different DMBS.

In the embodiment depicted in FIG. 2A, each second table has assigned a respective update time UT1, UT2 indicating a moment in time when said second table received and stored the latest data changes upon executing an incremental replication step. For example, in a single replication step, incremental data changes of the first columns SC1, SC2 and SC11 were collected, e.g. in a batch, and replicated to the second columns of table TT1. Upon storing said changes, said second table TT1 and thus, implicitly, also each of its second columns is assigned an update time UT1 being indicative of the moment of storing said data changes in table TT1.

Upon receiving the request for executing query T4S4 on the target database, the DBMS may parse said query in order to predict and determine that processing said requested statement will involve accessing the second columns TC2, TC8 and TC11. The DBMS will determine that column TC8 having assigned update time UT2 was updated more recently than columns TC1 and TC11. Thus, UT2 is used as the syncpoint time. The DBMSS will evaluate the source log 118 which may comprise all statements and transactions having been performed already on the source database for identifying all data changes between UT1 and UT2 that have been performed on the first columns SC2 and SC11. There will be no data changes between UT1 and UT2 in the first column SC8 as the respectively mapped second columns TC8 has assigned UT2, the syncpoint time, as its update time. Thus, instead of delaying execution of the requested statement T4S4 until all statements executed by the DBMS before receiving said request were replicated to the target database, only the incremental data changes between UT1 and UT2 selectively in tables SC2 and SC11 are replicated to the target database. Thus, only a small amount of data needs to be replicated before the requested statement is executed on the target database. When said incremental data changes have successfully been replicated to second columns TC2 and TC11, the update time of the second table TT1 and thus also the update times of all its second columns TC1, TC2 and TC11 are updated and set to UT2.

FIG. 2B shows another embodiment, where the update times UT3-UT6 are not assigned per second table (as in FIG. 2A), but for each individual second column. The mapping 202 assigns first and respective second columns to each other as explained for FIG. 2A. Upon receiving the request, the DBMS will determine and predict, by parsing the request or by evaluating a history 110 of previous requests, that second columns TC2, TC8 and TC11 will be accessed when processing the requested statement T4S4. Said columns respectively have assigned update times UT4, UT6 and UT5. The DBMS will identify UT4 as the earliest update time of said predicted second columns and thus will identify UT4 as a starting time. The DBMS will identify UT6 as the most recent update time of said predicted second columns and thus will identify UT6 as a syncpoint time. Then, the DBMS will selectively identify all data changes having been performed between UT4 and UT6 on the first columns SC2 and SC11 to the second columns TC2 and TC11 and set the update time of said columns to UT6. The update times of other columns of said tables may remain unaffected.

Figure 3:
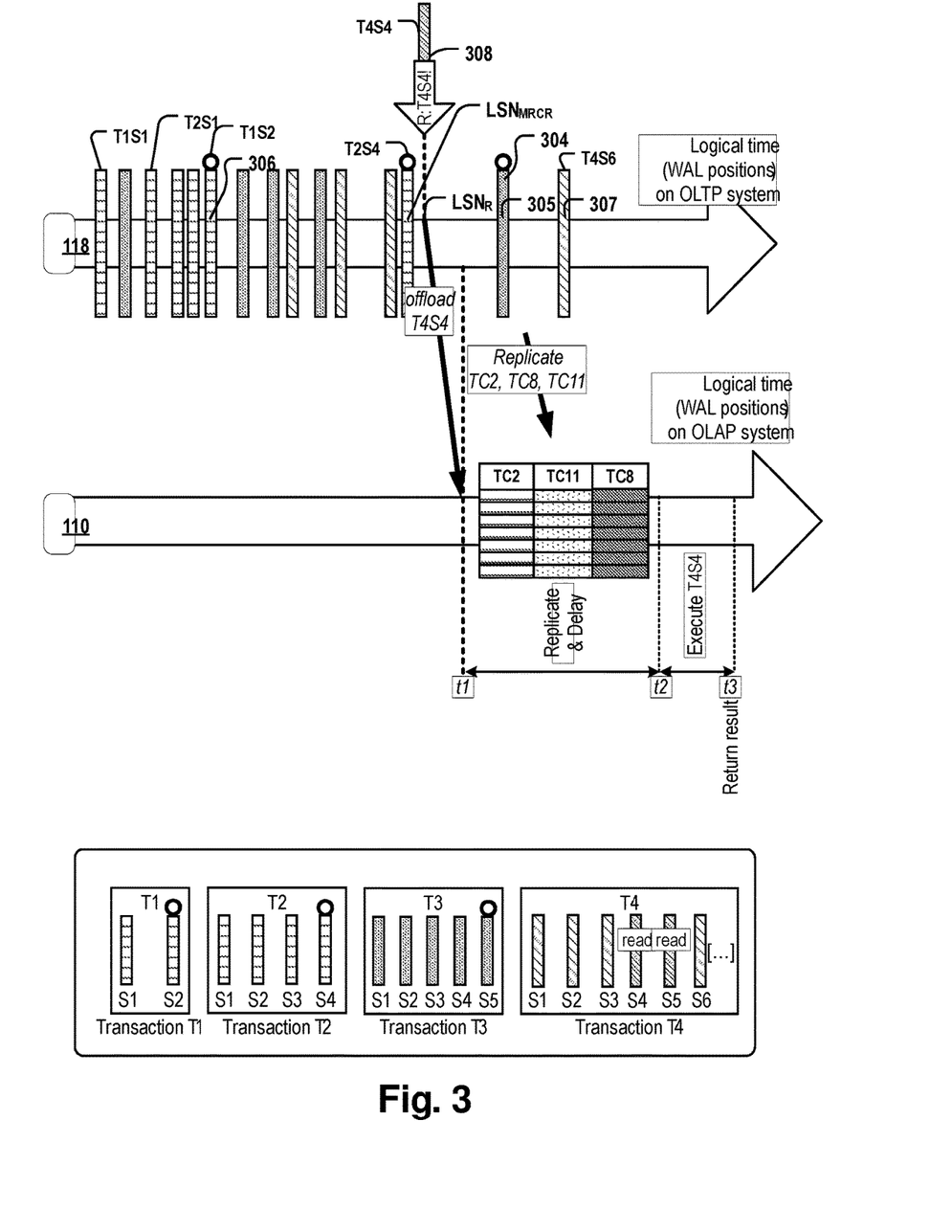
FIG. 3 shows data replication to the target database according to an embodiment.

FIG. 3 shows a set of transactions T1, T2 having committed in the source database 122 at the moment when the DBMS 104 receives the request 308 for executing a particular statement T4S4 of a transaction.

The box at the bottom of FIG. 3 depicts four transactions T1-T4 respectively comprising multiple statements. For example, transaction T1 comprises statement S1 (or 'T1S1') and statement S2 (or 'T1S2'). Transaction T2 comprises four statements S1-S4 (or 'T2S1-T2S4'). A transaction may consist of one or more read statements (SELECT), one or more write statements (UPDATE, INSERT, DELETE), or a mixture of read and write statements. As only write statements result in a data change in the source database that needs to be replicated, the bars overlaying the source log and the target log in FIG. 3 all represent write statements. It is possible, however, that a transaction also comprises one or more read statements such as, for example, T4S4 and T4S5 which do not result in data changes in the source database that need to be replicated. Each statement is represented in FIG. 3 by a bar symbol. A statement that results in a commit event of its respective transaction (i.e., a 'commit statement') is indicated by a circle at the top of its respective bar symbol. As can be derived from FIG. 3, at the moment when the request is received, transactions T1 and T2 have already committed in the source database at source log sequence numbers 306 and LSNMRCR. Transactions T3 and T4 are still ongoing when receiving the request 308. T3 will commit at commit statement T3S5 (corresponding to bar symbol 304) soon after the receipt of the request while it is unclear if and when T4 will commit at all.

The source log 118 comprises first commit log sequence number 306, LSNMRCR, 305 respectively indicating a moment when a respective one of said transactions T1, T2, T3 committed in the source database. The source commit log sequence number LSNMRCR indicates the commit event of one T2 of the transactions T1, T2, T3 which committed in the source database most recently before receiving the request: T1 (by commit statement T1S2) has committed before T2 (by commit statement T2S4). T3 and T4 have not committed at the moment of receiving the request. The execution of statements in the source database that belong to transactions that have not yet committed in the source database is not a "commit" of a transaction. Therefore, T2 is in the depicted example the "most recently committed transaction" in respect to the request 308. The moment when the DBMS 104 receives the request 308 to perform a database statement T4S4 is represented in the source log by LSNR. The LSNR may be attached to a request dispatched to the target database.

The DBMS predicts in response to receiving the query one or more second columns TC2, TC8, TC11 that will be accessed when performing the requested statement on the target database as described previously. After having replicated the data changes of columns SC2, SC8 and SC11 to second columns TC2, TC8, TC11, the update times of said columns may be updated to the syncpoint time determined for said request-specific replication. The DBMS may delay execution of the requested statement T4S4 in the target database until all second columns predicted to be accessed have received their respective incremental data changes.

A database management system comprising: a source database (122) comprising a plurality of first tables (ST1-ST4) comprising first columns (SC1-SC13); a target database (106) comprising a plurality of second tables (TT1-TT2) comprising second columns (TC1-TC13); wherein each of multiple ones of the first columns is mapped (200, 202) to one of the second columns, each one of said second columns being adapted to store replicated data changes of the first column mapped to said second column; wherein each of the second columns has assigned an update time (UT1-UT6), the update time being a moment in time when said second column most recently received incremental data changes from its mapped first column; wherein the database management system is configured for: the database management system receiving (602) a request (308) to perform a requested statement (T4S4), the statement being a database statement; the database management system predicting (604) one or more of the second columns that will be accessed when processing the requested statement (T4S4); the database management system determining (606), for each of the predicted second columns, its assigned update time; the database management system identifying (608) a syncpoint time, the syncpoint time being the most recent update time of all said determined update times; the database management system identifying (610) a starting time, the starting time being the earliest update time of all said determined update times; in case (612) the identified starting time differs from the identified syncpoint time, the database management system selectively and incrementally replicating (614) data changes from the first columns being mapped to the predicted second columns thus that all data changes imposed on said first columns between the starting time and the syncpoint time are replicated to said predicted second columns, wherein after said replication, the update time of each of said second columns is set (616) to the syncpoint time; the database management system delaying (618) execution of the requested statement (T4S4) until a successful termination of said replication; and after said termination, the database management system executing (620) the requested statement in the target database.

Technical effects and benefits of embodiments described herein can provide for an improved method for operating a DBMS, a computer program product and a DBMS.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for operating a database management computer system, the database management computer system comprising a source database and a target database, the source database comprising a plurality of first tables respectively comprising one or more first columns, the target database comprising a plurality of second tables respectively comprising one or more second columns, wherein each of multiple ones of the first columns is mapped to one of the second columns, each one of said second columns being adapted to store replicated data changes of the first column mapped to said second column, wherein each second column of the second columns has an assigned update time, the update time being a moment in time when said second column most recently received incremental data changes from its mapped first column, the method comprising:

receiving, by the database management computer system, a request via a network to perform a requested statement, the statement being a database statement, wherein the source database has an assigned source log and the target database has an assigned target log, wherein the update time is assigned to each second column of the second columns in the form of log sequence numbers of the source log or in form of log sequence numbers of the target log, wherein the source log and the target log are in sync;

predicting, by the database management computer system, one or more of the second columns that will be accessed when processing the requested statement, wherein predicting the one or more second columns comprises automatically evaluating a request history, the evaluation comprising identifying or calculating an access statistic, the access statistic being indicative of an access frequency of each second column of the second columns or of each second table of the second tables in the target database;

determining, by the database management computer system, for each predicted second column of the predicted second columns, its assigned update time;

identifying, by the database management computer system, a syncpoint time, the syncpoint time being the most recent update time of all said determined update times;

identifying, by the database management computer system, a starting time, the starting time being the earliest update time of all said determined update times;

based on the identified starting time differing from the identified syncpoint time, selectively and incrementally replicating, by the database management computer system, data changes from all first columns mapped to any one of the predicted second columns to said predicted second columns such that all data changes imposed on said first columns between the starting time and the syncpoint time are replicated to said predicted second columns, wherein subsequent to said replication, the update time of said each predicted second column of said predicted second columns is set to the syncpoint time, wherein performing the selective and incremental replication comprises, for each predicted second column of the predicted second columns includes:

identifying a start log sequence number being indicative of the update time currently assigned to said second column;

identifying an end log sequence number being indicative of the identified syncpoint time;

identifying all first columns mapped to one of the predicted second columns;

identifying, in the source log, all write statements having been performed on any one of said first columns between the start log sequence number and the end log sequence number;

identifying, within said identified write statements, all data changes applied on said identified first columns; and selectively applying the identified changes in the identified first columns to the second columns which are mapped to said first columns;

delaying, by the database management computer system, execution of the requested statement until a successful termination of said replication; and subsequent to said successful termination, the database management computer system executing the requested statement in the target database.

2. The computer-implemented method of claim 1, wherein predicting the one or more second columns further comprises:

automatically parsing the requested statement and using all second columns referenced in said requested statement as the predicted second columns.

3. The computer-implemented method of claim 1, wherein the update times are assigned to the second columns on a per-second-table basis and wherein update times of all second columns contained in the same one of the second tables are identical;

wherein the predicting of the one or more second columns comprises predicting one or more second tables that will be accessed when processing the requested statement and using all second columns contained in the predicted second tables as the predicted second columns;

wherein the determination of the update time of the second columns comprises determining the update time assigned to the second table comprising said second column and using said determined update time as the update time assigned to said second column; and wherein the execution of the replication comprises replicating the data changes from all first columns mapped to any one of the second columns contained in any one of the predicted second tables to their mapped second columns such that all data changes imposed on said first columns between the starting time and the syncpoint time are replicated to said predicted second tables, wherein subsequent to said replication, the update time of each predicted second table of said predicted second tables is set to the syncpoint time.

4. The computer-implemented method of claim 1, further comprising:

the database management system identifying in the source log a current source commit log sequence number the current source commit log sequence number indicating a commit event of a first one of the transactions which committed in the source database most recently before the receiving of the request, wherein performing the incremental replication of the data changes comprises identifying unreplicated data changes imposed on said first columns until the syncpoint time that are imposed by transactions having committed in the source database at or before said current source commit sequence number; and selectively replicating said identified data changes.

5. The computer-implemented method of claim 1, wherein the requested statement is one of a plurality of requested statements received by the database management system during a predefined first time interval, the method further comprising:

the database management system performing the prediction of the one or more of the second columns for each of the plurality of requested statements; and the database management system generating, from all second columns predicted for said plurality of requested statements, a unique set of predicted second columns and using said unique set of second columns as the one or more predicted second columns for performing the identification of the syncpoint time.

6. The computer-implemented method of claim 1, wherein the incremental replication of the data changes in multiple first columns to second columns being mapped to said first columns in response to receiving the request for executing the requested statement is performed in one or more batches, and wherein in addition data changes in multiple first columns are replicated automatically at second time intervals to second columns being mapped to said first columns.

7. The computer-implemented method of claim 6, further comprising:

compiling the one or more batches, each batch comprising statements of one or more transactions that have been executed in the source database and have not yet been replicated to the target database and that are directed at one of the first columns whose mapped second column is predicted to be accessed when processing the requested statement;

grouping the statements of each batch into one or more commit groups, wherein all statements contained in any of the commit groups belong to the same transaction having already committed in the source database, wherein said commit groups are free of statements of non-committed transactions;

replicating the batch, thereby replicating all data changes imposed by the statements in the one or more commit groups of the batch to the target database in a single step; and upon having successfully replicated the batch, updating the update time assigned to each second column to the syncpoint time.

8. The computer-implemented method of claim 7, further comprising, for each second column of the target database:

automatically evaluating a request history of said second column, the request history being indicative of the number of requested statements having been received previously during a second time interval and whose processing comprised accessing said second column;

automatically calculating a batch size for said second column, thereby using the request history of said second column as input, the batch size being indicative of the maximum allowable number of statements within an individual batch or a maximum batch size, wherein the calculation is such that the maximum allowable number or maximum batch size negatively correlates with an access frequency of said second column; and performing the compiling, grouping, replicating and updating, whereby the creation of the batches is performed in accordance with the automatically calculated batch size, and whereby replicating said batches also comprises updating the update time assigned to said second columns.

9. The computer-implemented method of claim 8, wherein the one or more batches are a plurality of batches having different batch sizes, wherein the inclusion of the yet unreplicated data changes in said first columns in the multiple batches during one of the second time intervals comprises:

for each first column whose changes were included:
evaluating the target log for identifying, for each of the first columns, an access frequency, the access frequency being indicative of the frequency of accessing the one of the second columns mapped to said first column in response to previous requests; and distributing statements for replicating the yet unreplicated data changes to the sequence of batches, whereby data changes of first columns whose mapped second column have the highest access frequency are distributed to the one of the multiple batches having the smallest batch size, and whereby data changes of first columns whose mapped second column have the lowest access frequency are distributed to the one of the multiple batches with the largest batch size.

10. The computer-implemented method of claim 1, further comprising:

regularly, at third time intervals, evaluating each of the first columns for determining if said first columns comprise any new, unreplicated data changes; and if one of said evaluated first columns does not comprise any new unreplicated data changes, setting the update time of the one of the second columns mapped to said first column to the time of performing said evaluation.

11. The computer-implemented method of claim 1,
wherein the structure of the source database is optimized for a first type of database queries,
wherein the structure of the target database is optimized for a second type of database queries, the second type differing from the first type of queries; and
wherein receiving the requested statement is performed by: the database management system receiving a request for executing a transaction, said transaction comprising the requested statement and optionally one or more further statements, the method further comprising, for each of the statements in said transaction:
the database management system evaluating the statement for determining if said statement specifies a database query of the first type or of the second type;
based on said statement determined to be of the first type, the database management system dispatching the statement for execution to the source database, skipping the delaying and immediately executing the requested statement in the source database; and
based on said statement determined to be of the second type, the database management system dispatching the statement for execution to the target database and performing the delaying and the delayed execution of the statement in the target database,
wherein the requested statement is determined to be of the second type and is dispatched to the target database.

12. The computer-implemented method of claim 1, further comprising:
identifying a requested transaction to which the requested statement belongs;
subsequent to the delaying, executing statements preceding the requested statement and being contained in the identified requested transaction, the execution of the preceding statements and of the requested statement being performed in the target database in accordance with the order of said statements within the requested transaction, wherein executing the requested statement comprises reading data from the target database, the read data also comprising changes imposed by the preceding statements;
returning the read data; and
subsequent to returning the read data, undoing the data changes in the target database imposed by the preceding statements.

13. A computer program product comprising:
a tangible storage medium readable by a processor of a question answering computer system and storing instructions for execution by the processor to perform a method for operating a database management computer system, the method comprising:
the database management computer system receiving a request to perform a requested statement, the statement being a database statement,
the database management computer system comprising a source database and a target database, the source database comprising a plurality of first tables respectively comprising one or more first columns, the target database comprising a plurality of second tables respectively comprising one or more second columns, wherein each of multiple ones of the first columns is mapped to one of the second columns, each one of said second columns being adapted to store replicated data changes of the first column mapped to said second column, and wherein each of the second columns has an assigned update time, the update time being a moment in time when said second column most recently received incremental data changes from its mapped first column;
the database management computer system predicting one or more of the second columns that will be accessed when processing the requested statement, wherein predicting the one or more second columns comprises automatically evaluating a request history, the evaluation comprising identifying or calculating an access statistic, the access statistic being indicative of an access frequency of each second column of the second columns or of each second table of the second tables in the target database;
the database management computer system determining, for each predict second column of the predicted second columns, its assigned update time;
the database management computer system identifying a syncpoint time, the syncpoint time being the most recent update time of all said determined update times;
the database management computer system identifying a starting time, the starting time being the earliest update time of all said determined update times;
based on the identified starting time differing from the identified syncpoint time, the database management computer system selectively and incrementally replicating data changes from all first columns mapped to any one of the predicted second columns to said predicted second columns such that all data changes imposed on said first columns between the starting time and the syncpoint time are replicated to said predicted second columns, wherein subsequent to said replication, the update time of each of said predicted second columns is set to the syncpoint time, wherein performing the selective and incremental replication comprises, for each predicted second column of the predicted second columns includes:
identifying a start log sequence number being indicative of the update time currently assigned to said second column;
identifying an end log sequence number being indicative of the identified syncpoint time;
identifying all first columns mapped to one of the predicted second columns;
identifying, in the source log, all write statements having been performed on any one of said first columns between the start log sequence number and the end log sequence number;
identifying, within said identified write statements, all data changes applied on said identified first columns; and
selectively applying the identified changes in the identified first columns to the second columns which are mapped to said first columns;
the database management computer system delaying execution of the requested statement until a successful termination of said replication; and subsequent to said successful termination, the database management system executing the requested statement in the target database.

14. The computer program product of claim 13, wherein predicting the one or more second columns further comprises:
automatically parsing the requested statement and using all second columns referenced in said requested statement as the predicted second columns.

15. The computer program product of claim 13,
wherein the update times are assigned to the second columns on a per-second-table basis and wherein update times of all second columns contained in the same one of the second tables are identical;
wherein the predicting of the one or more second columns comprises predicting one or more second tables that will be accessed when processing the requested statement and using all second columns contained in the predicted second tables as the predicted second columns;
wherein the determination of the update time of the second columns comprises determining the update time assigned to the second table comprising said second column and using said determined update time as the update time assigned to said second column; and
wherein the execution of the replication comprises replicating the data changes from all first columns mapped to any one of the second columns contained in any one of the predicted second tables to their mapped second columns such that all data changes imposed on said first columns between the starting time and the syncpoint time are replicated to said predicted second tables, wherein subsequent to said replication, the update time of each of said predicted second tables is set to the syncpoint time.

16. The computer program product of claim 13, wherein the method further comprises:
the database management system identifying in the source log a current source commit log sequence number the current source commit log sequence number indicating a commit event of a first one of the transactions which committed in the source database most recently before the receiving of the request,
wherein performing the incremental replication of the data changes comprises identifying unreplicated data changes imposed on said first columns until the syncpoint time that are imposed by transactions having committed in the source database at or before said current source commit sequence number; and selectively replicating said identified data changes.

17. The computer program product of claim 13, wherein the requested statement is one of a plurality of requested statements received by the database management system during a predefined first time interval, and the method further comprises:
the database management system performing the prediction of the one or more of the second columns for each of the plurality of requested statements; and
the database management system generating, from all second columns predicted for said plurality of requested statements, a unique set of predicted second columns and using said unique set of second columns as the one or more predicted second columns for performing the identification of the syncpoint time.

18. A computer-implemented method for operating a database management system, the database management system comprising a source database and a target database, the source database comprising a plurality of first tables, each first table comprising one or more first columns, the target database comprising a plurality of second tables, each second table respectively comprising one or more second columns, wherein each of multiple ones of the first columns is mapped to one of the second columns, wherein the database management system is configured to replicate data changes of any one of the first columns to its mapped second column in a batch-wise manner, wherein the replication of the data changes comprises:
automatically and repeatedly evaluating, by a computer system, a request history of each second column of the second columns for determining an access frequency of said second column, the request history being indicative of the number of statements having been performed on said second column previously during a predefined time interval in response to a request of a client via a network;
automatically, by the computer system, calculating a batch size for said second column, the batch size being indicative of the maximum allowable number of statements within an individual batch or a maximum batch size, wherein the calculation is such that the maximum allowable number or maximum batch size negatively correlates with an access frequency of said second column; and
for each second column of the second columns: creating a batch by pooling data changes of the first column mapped to said second column that have not yet been replicated to said second column, wherein the creation of the batches is performed in accordance with the automatically calculated batch size,
upon determining that the size of said batch has reached its calculated batch size, automatically performing, by the computer system, the batch, thereby replicating the data changes pooled in said batch to said second column, wherein the replicating the data changes pooled in said batch also comprises updating the update time assigned to said second columns.

* * * * *